United States Patent
Meiri et al.

(10) Patent No.: US 11,360,688 B2
(45) Date of Patent: Jun. 14, 2022

(54) CASCADING SNAPSHOT CREATION IN A NATIVE REPLICATION 3-SITE CONFIGURATION

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 551 days.

(21) Appl. No.: 15/971,153

(22) Filed: May 4, 2018

(65) Prior Publication Data
US 2019/0339870 A1 Nov. 7, 2019

(51) Int. Cl.
  *G06F 3/06* (2006.01)
  *G06F 11/14* (2006.01)
  *G06F 9/455* (2018.01)

(52) U.S. Cl.
  CPC .............. *G06F 3/065* (2013.01); *G06F 3/067* (2013.01); *G06F 3/0614* (2013.01); *G06F 9/45558* (2013.01); *G06F 11/1464* (2013.01); *G06F 11/1466* (2013.01); *G06F 2009/45562* (2013.01); *G06F 2009/45595* (2013.01); *G06F 2201/84* (2013.01)

(58) Field of Classification Search
None
See application file for complete search history.

(56) References Cited

U.S. PATENT DOCUMENTS

| | | |
|---|---|---|
| 6,496,908 B1 | 12/2002 | Kamvysselis et al. |
| 6,553,464 B1 | 4/2003 | Kamvysselis et al. |
| 6,640,280 B1 | 10/2003 | Kamvysselis et al. |
| 6,862,632 B1 | 3/2005 | Halstead et al. |
| 6,883,018 B1 | 4/2005 | Meiri et al. |
| 6,886,164 B2 | 4/2005 | Meiri |
| 6,898,685 B2 | 5/2005 | Meiri et al. |
| 6,910,075 B2 | 6/2005 | Marshak et al. |
| 6,938,122 B2 | 8/2005 | Meiri et al. |
| 6,944,726 B2 | 9/2005 | Yoder et al. |
| 6,968,369 B2 | 11/2005 | Veprinsky et al. |
| 6,976,139 B2 | 12/2005 | Halstead et al. |
| 7,000,086 B2 | 2/2006 | Meiri et al. |

(Continued)

OTHER PUBLICATIONS

U.S. Appl. No. 16/050,247, filed Jul. 31, 2018, Schneider et al.

(Continued)

*Primary Examiner* — Kaushikkumar M Patel
(74) *Attorney, Agent, or Firm* — Daly, Crowley, Mofford & Durkee, LLP

(57) ABSTRACT

In one aspect a data replication process in a storage system includes creating, at a first target site, an empty container in a storage system. The empty container matches a container at a source site in response to initiation of an asynchronous data replication process. An aspect also includes transmitting a command to a second target site to create a container at the second target site. The first target site performs the asynchronous data replication process, which includes scanning the data upon receipt from the source site for a first target replication cycle and transmitting the scanned data to the container at the second target site for a second target replication cycle.

17 Claims, 5 Drawing Sheets

(56) References Cited

U.S. PATENT DOCUMENTS

| | | |
|---|---|---|
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,165,141 B2 * | 1/2007 | Cochran ............. G06F 11/2058 711/114 |
| 7,174,423 B2 | 2/2007 | Meiri et al. |
| 7,191,299 B1 * | 3/2007 | Kekre ................. G06F 11/2074 707/999.202 |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,702,953 B2 * | 4/2010 | Spear ................. G06F 11/2058 714/5.11 |
| 7,870,195 B1 | 1/2011 | Meiri |
| 8,046,545 B2 | 10/2011 | Meiri et al. |
| 8,078,813 B2 | 12/2011 | LeCrone et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,468,180 B1 | 6/2013 | Meiri et al. |
| 8,578,204 B1 | 11/2013 | Ortenberg et al. |
| 8,600,943 B1 | 12/2013 | Fitzgerald et al. |
| 8,677,087 B2 | 3/2014 | Meiri et al. |
| 8,694,700 B1 | 4/2014 | Natanzon et al. |
| 8,706,959 B1 | 4/2014 | Arnon et al. |
| 8,719,497 B1 | 5/2014 | Don et al. |
| 8,732,124 B1 | 5/2014 | Arnon et al. |
| 8,782,357 B2 | 7/2014 | Halstead et al. |
| 8,799,211 B1 * | 8/2014 | Bezbaruah ............. G06F 16/184 707/610 |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,914,596 B2 | 12/2014 | Lecrone et al. |
| 8,966,211 B1 | 2/2015 | Arnon et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,304,889 B1 | 4/2016 | Chen et al. |
| 9,323,750 B2 | 4/2016 | Natanzon et al. |
| 9,342,465 B1 | 5/2016 | Meiri |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,483,355 B1 | 11/2016 | Meiri et al. |
| 9,524,220 B1 | 12/2016 | Veprinsky et al. |
| 9,558,083 B2 | 1/2017 | LeCrone et al. |
| 9,606,739 B1 | 3/2017 | LeCrone et al. |
| 9,606,870 B1 | 3/2017 | Meiri et al. |
| 9,753,663 B1 | 9/2017 | LeCrone et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,055,161 B1 | 8/2018 | Meiri et al. |
| 10,095,428 B1 | 10/2018 | Meiri et al. |
| 10,152,527 B1 | 12/2018 | Meiri et al. |
| 2004/0260902 A1 * | 12/2004 | Stanley ............... G06F 11/2058 711/165 |
| 2005/0050115 A1 * | 3/2005 | Kekre ................. G06F 11/2058 |
| 2005/0182910 A1 * | 8/2005 | Stager ................. G06F 11/1456 711/162 |
| 2007/0100909 A1 * | 5/2007 | Padovano ........... G06F 11/2069 |
| 2017/0295230 A1 * | 10/2017 | Hatfield .............. H04L 67/1095 |
| 2018/0150229 A1 * | 5/2018 | Brown .................... G06F 3/065 |
| 2018/0349042 A1 * | 12/2018 | Brown ................. G06F 3/0619 |
| 2019/0018727 A1 * | 1/2019 | Huh .................... G06F 11/1446 |

OTHER PUBLICATIONS

U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 15/001,789, filed Jan. 20, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,188, filed Mar. 30, 2016, Meiri et al.
U.S. Appl. No. 15/499,297, filed Apr. 27, 2017, Kucherov et al.
U.S. Appl. No. 15/499,303, filed Apr. 27, 2017, Kucherov et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.
U.S. Appl. No. 15/970,243, filed May 3, 2018, Schneider et al.

* cited by examiner

CASCADING SNAPSHOT CREATION IN A NATIVE REPLICATION 3-SITE CONFIGURATION

BACKGROUND

Computer data is increasingly vital to modern organizations; therefore, protecting against data loss in the event of a system failure is an increasingly important organization objective. Data protection systems for storing organizational source (e.g., production) site data on a periodic basis suffer from several drawbacks. First, they require a system shutdown during backup, since the data being backed up cannot be used during the backup operation. Second, they limit the points in time to which the production site can recover. For example, if data is backed up on a daily basis there may be several hours of lost data in the event of a disaster. Third, the data recovery process itself is time consuming as well as system resource consuming.

Some data protection systems use data replication by creating a copy of the organization's production site data on a secondary backup storage system and updating the backup with changes. In some instances, multiple backup storage systems may be employed in which some backup storage locations are local to the production storage system (i.e., the source site), while others are remote (i.e., target sites). Data replication processes may take longer to complete for backup storage locations that are remote from the production storage system as compared to backup storage locations that are local to the production site.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

In an asynchronous cascading replication process, replication is performed whereby a storage cluster A creates cycles of consistency via snapshots, sends commands to a storage cluster B to create matching (empty) containers, and sends the differences between generations of snapshots from A to B. For example, a cycle counter N on storage cluster A may advance from time to time. When the cycle counter advances, a new set of snapshots is created in A, called A(N). Storage cluster A then compares A(N) with the previously generated snapshot set A(N−1) and sends the difference to storage cluster B. When the containers in B receive the full difference, they become snapshots. Once storage cluster B receives a command to create container B(N), it immediately sends a similar command to a storage cluster C, creating snapshot containers C(N). Data transmission from A to B begins. Storage cluster B starts a scan process that captures any data sent from A to B and sends it to C in containers C(N). Storage cluster B does not need to wait for cycle N to finish—it can start sending data as it receives it, or in the background. When all of the cycle data is transmitted to B, storage cluster B marks the cycles as receive complete, When all of the cycle data is sent from B to C, storage cluster B marks the cycles as transmit complete. When both marks are on, B announces that the cycle is complete by sending a message to storage cluster C. Storage cluster C can then mark the container as a complete snapshot set and a new consistent point-in-time in the asynchronous replication process.

One aspect may provide a method for performing a data replication process in a storage system. The method includes creating, at a first target site, an empty container in a storage system. The empty container matches a container at a source site in response to initiation of an asynchronous data replication process. The method also includes transmitting, by the first target site, a command to a second target site to create a container at the second target site. The first target site performs the asynchronous data replication process, which includes scanning the data upon receipt from the source site for a first target replication cycle and transmitting the scanned data to the container at the second target site for a second target replication cycle.

Another aspect may provide a system performing a data replication process in a storage system. The system includes a memory having computer-executable instructions. The system also includes a processor operated by a first target site. The process executes the computer-executable instructions. When executed by the processor, the computer-executable instructions cause the processor to perform operations. The operations include creating, at the first target site, an empty container in a storage system. The empty container matches a container at a source site in response to initiation of an asynchronous data replication process. The operations also include transmitting a command to a second target site to create a container at the second target site. The first target site performs the asynchronous data replication process, which includes scanning the data upon receipt from the source site for a first target replication process and transmitting the scanned data to the container at the second target site for a second target replication process.

Another aspect may provide a computer program product embodied on a non-transitory computer readable medium. The computer program product includes instructions that, when executed by a computer at a first target site, causes the computer to perform operations. The operations include creating, at the first target site, an empty container in a storage system. The empty container matches a container at a source site in response to initiation of an asynchronous data replication process. The operations also include transmitting a command to a second target site to create a container at the second target site. The first target site performs the asynchronous data replication process, which includes scanning the data upon receipt from the source site for a first target replication process and transmitting the scanned data to the container at the second target site for a second target replication process.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

In an asynchronous cascading replication setup for three storage clusters A, B, and C, a consistency group in the first storage cluster A is replicated to the second storage cluster B, and from the second storage cluster B to the third storage cluster C. Embodiments described herein enable the creation of consistent delayed copies of replicated data on multiple backup targets while using minimal overhead.

Figure 1:
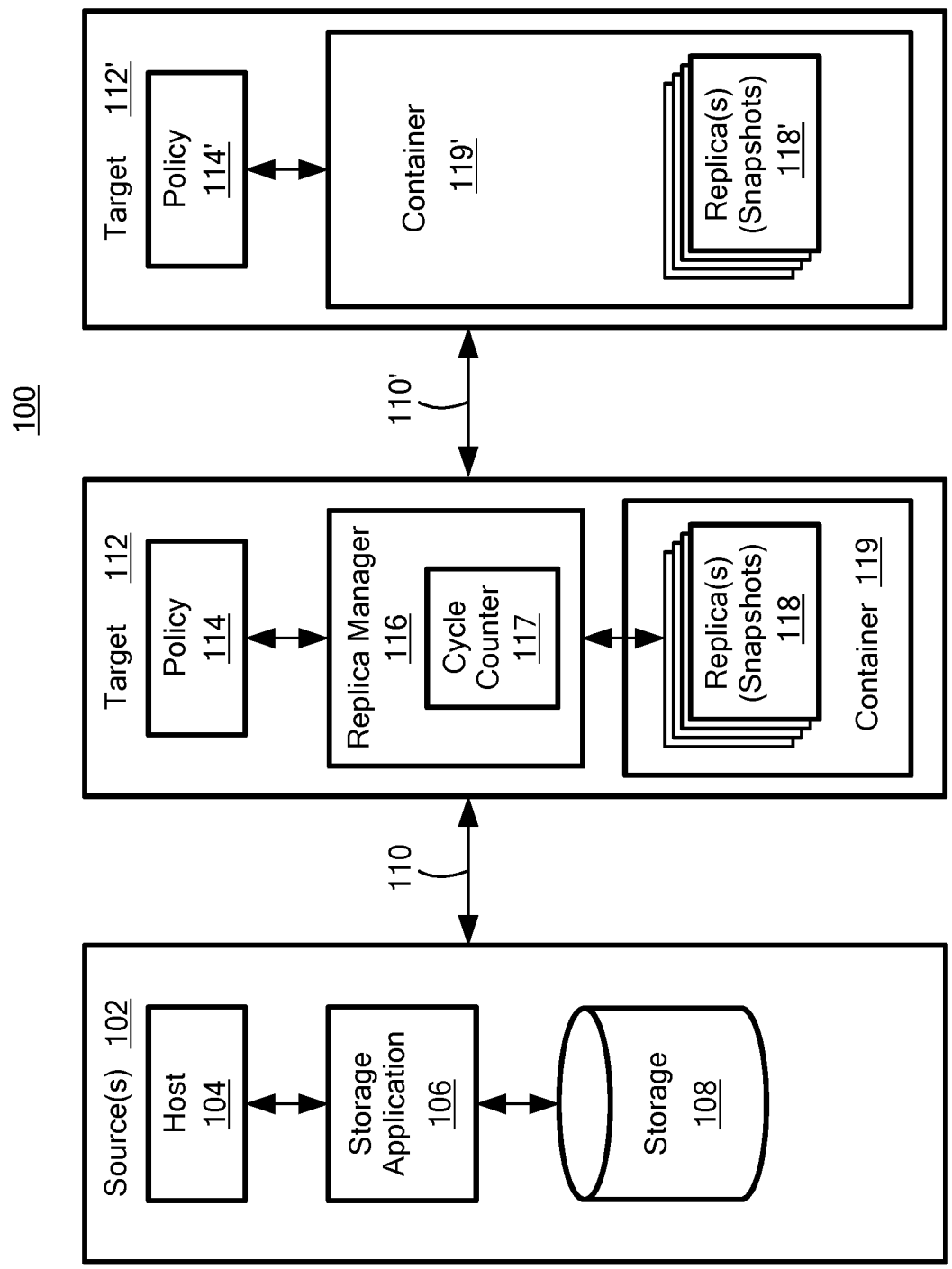
FIG. 1 is a block diagram of a storage system to perform cascading data replication from a source to a first target and from the first target to a second target in accordance with an illustrative embodiment.

Turning now to FIG. 1, an example storage system 100 for implementing asynchronous cascading data replication cycles will now be described. Storage system 100 may include at least one source site 102 and at least two target sites 112 and 112.' In an embodiment, target site 112 is either co-located with source site 102 or is in close geographic proximity (e.g., within the same building or building complex) with the source site 102. By contrast, target site 112' is remotely located from both the source site 102 and the target site 112. For example, target site 112' may be geographically dispersed across cities, states, or even countries with respect to source site 102 and target site 112'.

Source site 102 may include a host 104, storage application 106, and data storage 108. In some embodiments, storage 108 may include one or more storage volumes (not shown), that operate as active or production volumes.

Host 104 may perform input/output (I/O) operations on storage 108 (e.g., read data from and write data to storage 108). In some embodiments, the I/O operations may be intercepted by and controlled by the storage application 106. As changes are made to data stored on storage 108 via the I/O operations from host 104, or over time as storage system 100 operates, storage application 106 may perform data replication from the source site 102 to the target site 112 over a communication network 110. In some embodiments, the communication network 110 may include internal (e.g., short distance) communication links (not shown) to transfer data between storage volumes for storing replicas 118 (also referred to herein as snapshots), such as an InfiniBand (IB) link or Fibre Channel (FC) link.

In illustrative embodiments, storage system 100 may employ a snapshot (or replication) mechanism to replicate data between source site 102 and target site 112. A snapshot (or replica) may be created from data within storage 108 and transferred to the target site 112 during a data replication cycle by data replication.

Data replication may be performed based on data replication policies that may define various settings for data recovery operations, shown as policy 114 in target site 112. For example, policy 114 may define a plurality of attributes, such as a frequency with which replicas are generated and how long each replica 118 is kept at target site 112. Policy 114 may also define a remote replica lag (e.g., the length of time during which updates may be lost in case of a source site failure), a recovery point objective (RPO) (e.g., a maximum acceptable lag time between the time data is committed to the source site 102 and the time the data is committed to the target site 112 or an acceptable amount of data loss measured in time), a recovery time objective (RTO) (e.g., the time taken to perform the recovery), the mode of replication (e.g., synchronous, asynchronous, continuous data protection (CDP), point in time (PIT), and so forth), and/or other attributes.

As described herein, in example embodiments, data replication may be asynchronous data replication performed at time-based intervals during operation of storage system 100. The timing of asynchronous replication cycles and the retention of the replicas 118 may be managed by replica manager 116 of target site 112. Data replication may alternatively be synchronous data replication performed when data is changed on source site 102.

For example, asynchronous data replication may periodically generate snapshots (or replicas), scan and compare the snapshots to determine changes in data between the snapshots, and transfer the data difference to target site 112. In the scanning process, the entire range of a snapshot is traversed, from address 0 to the last address in the snapshot. In this context, the scan traverses the address-to-hash (A2H) meta-data structure and locates each entry in this structure. Each entry in the A2H structure is then compared with the same entry in the snapshot of the previous cycle to determine any changes. In embodiments, the storage application 106 may employ a cycle counter (not shown), which upon advancing, generates a new set or generation of snapshots on the storage 108 and is referred to herein as A(N). The storage application 106 compares A(N) with a previously generated snapshot set A(N−1), sends a command to the target site 112 to create a new container (e.g., container 119), and sends the difference between the snapshots to target site 112. Once target site 112 receives the difference, it stores the data differences in container 119. Once the full difference among snapshots is received at target site 112, the difference is stored as the new set of snapshots.

The frequency with which to perform replication cycles may be determined by a recovery point objective (RPO) and/or retention policy settings of policy 114. For example, policy 114 may define an RPO setting of x seconds, where x may be a positive integer, to ensure that the most recent available replica 118 stored on target site 112 reflects the state of data stored on source site 102 no longer than x seconds ago. Policy 114 may also determine how many replicas 118 should be maintained, at what time (e.g., what time of day, week, month, etc.), and for what duration.

In illustrative embodiments, policy 114 may set the RPO to a relatively short duration (e.g., on the order of 1 or 2 seconds) between asynchronous data replication cycles.

In addition to managing replicas 118 according to a policy 114 (e.g., a replication and/or retention policy), the replica manager 116 may also include a cycle counter 117 to track generations of snapshot sets over time, as will be described further herein.

In an embodiment, target site 112 is communicatively coupled to a second target site 112' over a communications link 110'. The communication link 110' may be a long-distance communication network of a storage area network (SAN), e.g., over an Ethernet or Internet (e.g., TCP/IP) link that may employ, for example, the iSCSI protocol. The target site 112 receives data transmissions from the source site 102 and forwards the data onto the target site 112'. In an embodiment, the target site 112 tracks the progress of the incoming data as it is received from the source site 102 and further tracks the progress of the data transmissions delivered to the second target site 112'. Replicas 118 and 118', or snapshots, of the replicated data are stored both in storage containers 119 (on target site 112) and 119' (on target site 112'), respectively.

Figure 2:
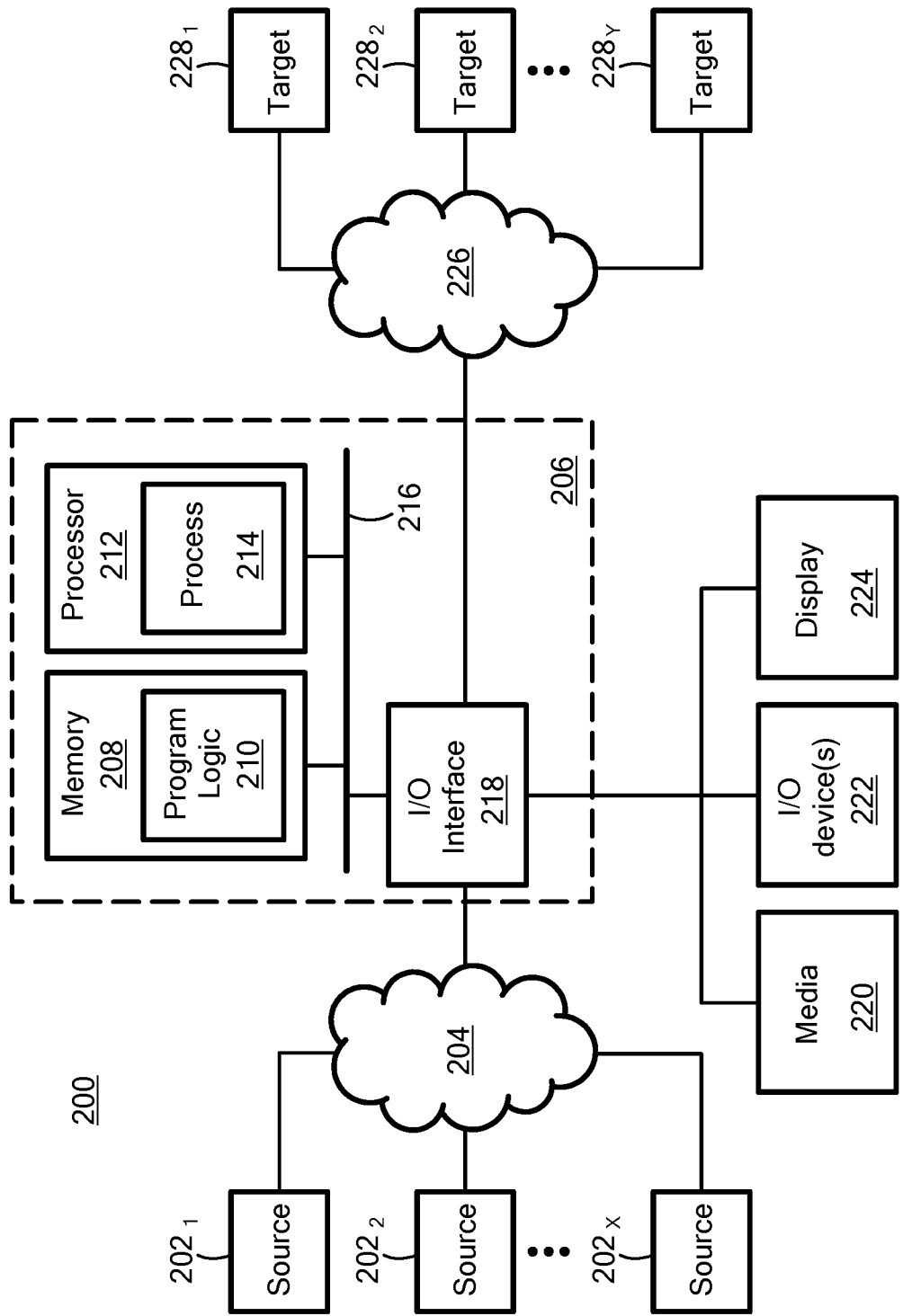
FIG. 2 is a block diagram of another storage system to perform cascading data replication from a source to a first target and from the first target to a second target in accordance with an illustrative embodiment.

Referring to FIG. 2, in an illustrative embodiment, apparatus 206 may form part of system 200 and include a memory 208 storing program logic 210, a processor 212 for executing a process 214, and a communications I/O interface 218, connected via a bus 216 to allow communication between memory 208, processor 212 and devices external to apparatus 206. Apparatus 206 may correspond to elements of the target site 112 of FIG. 1. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via a network 204. Source devices $202_1$-$202_X$ may correspond to elements of the source site 102 in FIG. 1. In some embodiments, communications I/O interface 218 may couple apparatus 206 to one or more target devices $228_1$-$228_Y$ via networks 226. Target devices $228_1$-$228_Y$ may correspond to elements of the target site 112' in FIG. 1. In some embodiments, networks 226 of FIG. 2 may include a communication fabric between volumes of targets 228. For example, in some embodiments, networks 226 may include an Infini-Band (IB) network or a Fibre Channel (FC) network. Networks 226 may also include a long-distance communication network of a storage area network (SAN), e.g., over an Ethernet or Internet (e.g., TCP/IP) link that may employ, for example, the iSCSI protocol.

Figure 3:
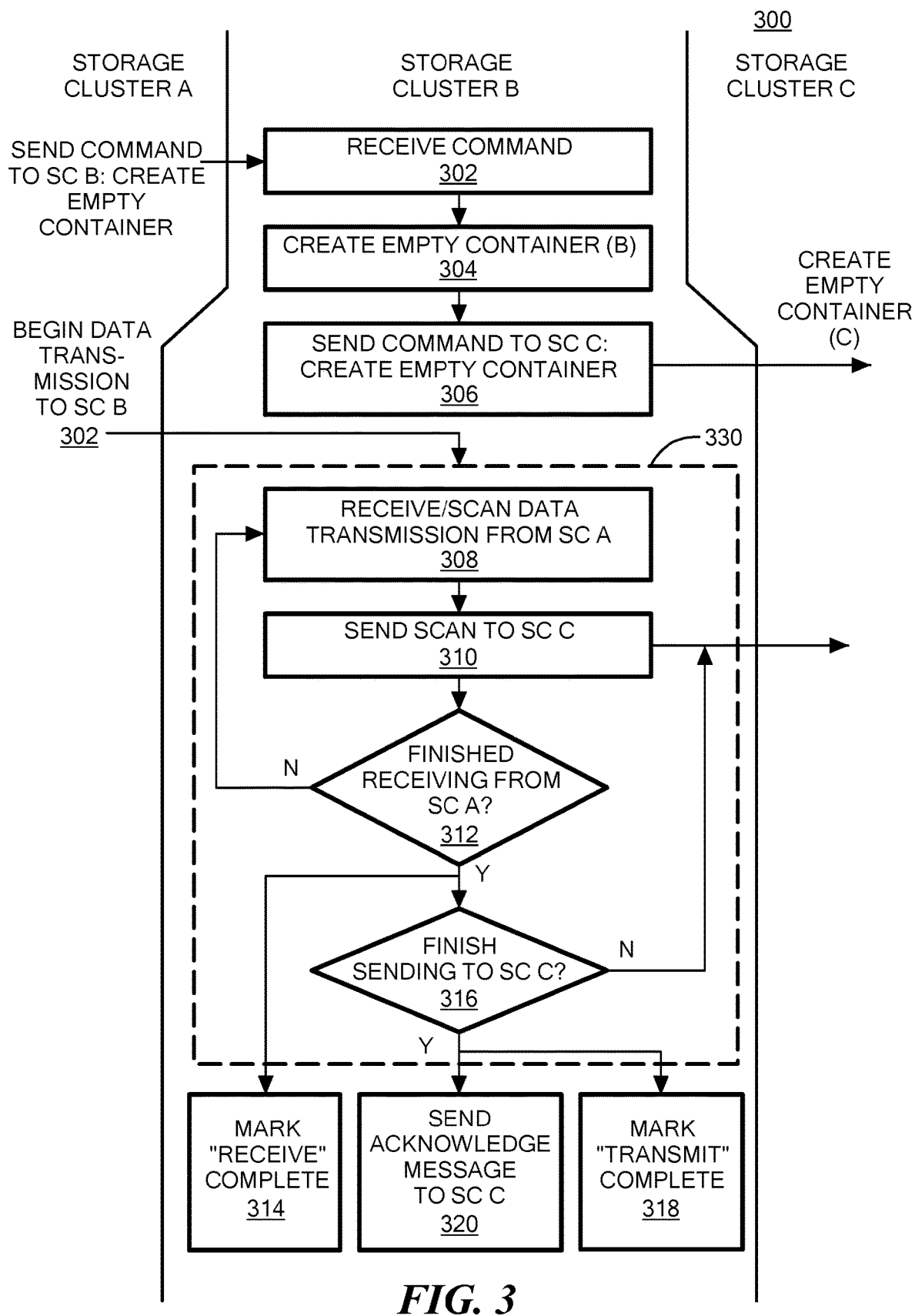
FIG. 3 is a flow diagram of a process to perform asynchronous cascading data replication from a source to a first target and from the first target to a second target in accordance with an illustrative embodiment.

Turning now to FIG. 3, a process 300 for implementing the cascading data replication processes will now be described in accordance with illustrative embodiments. In the process of FIG. 3, a storage cluster A refers to a source site (e.g., site 102 of FIG. 1) or a source device 202 of FIG. 2. Storage cluster B refers to a target site 112 of FIG. 1 or one of target devices 228 of FIG. 2. Storage cluster C refers to target site 112' of FIG. 1 or another one of target devices 228 of FIG. 2.

The process 300 of FIG. 3 assumes that a storage cluster A (e.g., source site) has initiated replication of data at its site in a first phase of a cascading replication process. The storage cluster A sends a command over a network (e.g., network 110) to storage cluster B to create a matching empty container (e.g., container 119 of FIG. 1). In particular, for each replication cycle, a snapshot is taken on the source site and an empty snapshot container is created on the target site (e.g., container 119). On the source site, this newly created snapshot is compared with the snapshot created in the previous cycle. At the target site, this empty snapshot is used as a container to receive the changes. Thus, in every replication cycle, two snapshots are created, one at the source site and one at the target site. These are referred to as matching snapshots, and corresponding matching containers, since they are implemented for the same replication cycle.

At block 302, storage cluster B receives the command and creates an empty container 119 to store the replicated data at block 304. In turn, storage cluster B initiates a command to storage cluster C over a network (e.g., network 110' of FIG. 1) to create an empty container (e.g., container 119') in block 306. In addition to storing the replicated data from storage cluster A, the container snapshot at storage cluster B now also serves as a source for finding changes and transmitting the changes to storage cluster C. Thus, instead of two matching snapshots (from A to B replication), there are now three matching snapshots (from A to B to C).

Blocks 308-312 and 316 in FIG. 3 refer to a cycle 330 in which the actions performed therein may be repeated as needed in order to complete the cascading replication process. In an embodiment, the replica manager 116 tracks this activity via the cycle counter 117. At block 308, storage cluster B receives and scans data transmitted from storage cluster A. As the data is received and scanned by storage cluster B, it is simultaneously (i.e., in parallel) transmitted to storage cluster C's container 119' in block 310. As the storage cluster B receives data it can increase the cycle counter for each snapshot or increment of data received from source site 102. As the data is transmitted to storage cluster C, the cycle counter can then be decremented accordingly. It will be understood that the data received from storage cluster A can be scanned and transmitted to storage cluster B as it is received and before the entire transmission has been received by storage cluster B from storage cluster A, as provided in the cycle 330 of FIG. 3.

In block 312, it is determined whether the transmission of data is complete between storage cluster A and storage cluster B (e.g., when all of the data is received by the storage cluster B). If not, the storage cluster B continues to receive replication data from storage cluster A, scanning the data at block 308 and sending the scanned data to storage cluster C in block 310. If, however, the transmission of data has completed in block 312, which is referred to herein as a first target replication cycle, storage cluster B marks the cycle as "receive" complete in block 314.

If the transmission of data from storage cluster A to storage cluster B has completed in block 312, it is determined whether the transmission of data from storage cluster B to storage cluster C has completed in block 316 (e.g., when all of the data has been transmitted from storage cluster B to storage cluster C). If not, the process returns to block 310 and storage cluster B continues to send replication data to storage cluster C. If, however, the transmission of data from storage cluster B to storage cluster C has completed in block 316, which is referred to herein as a second target replication cycle, the transmission is marked as cycle "transmit" complete in block 318 and an acknowledgement message is sent from storage cluster B to storage cluster C to indicate the end of the data transmission in block 320.

Storage cluster C can mark the container 119' as a complete snapshot set and as a new consistent point in time for the asynchronous replication process.

Figure 4:
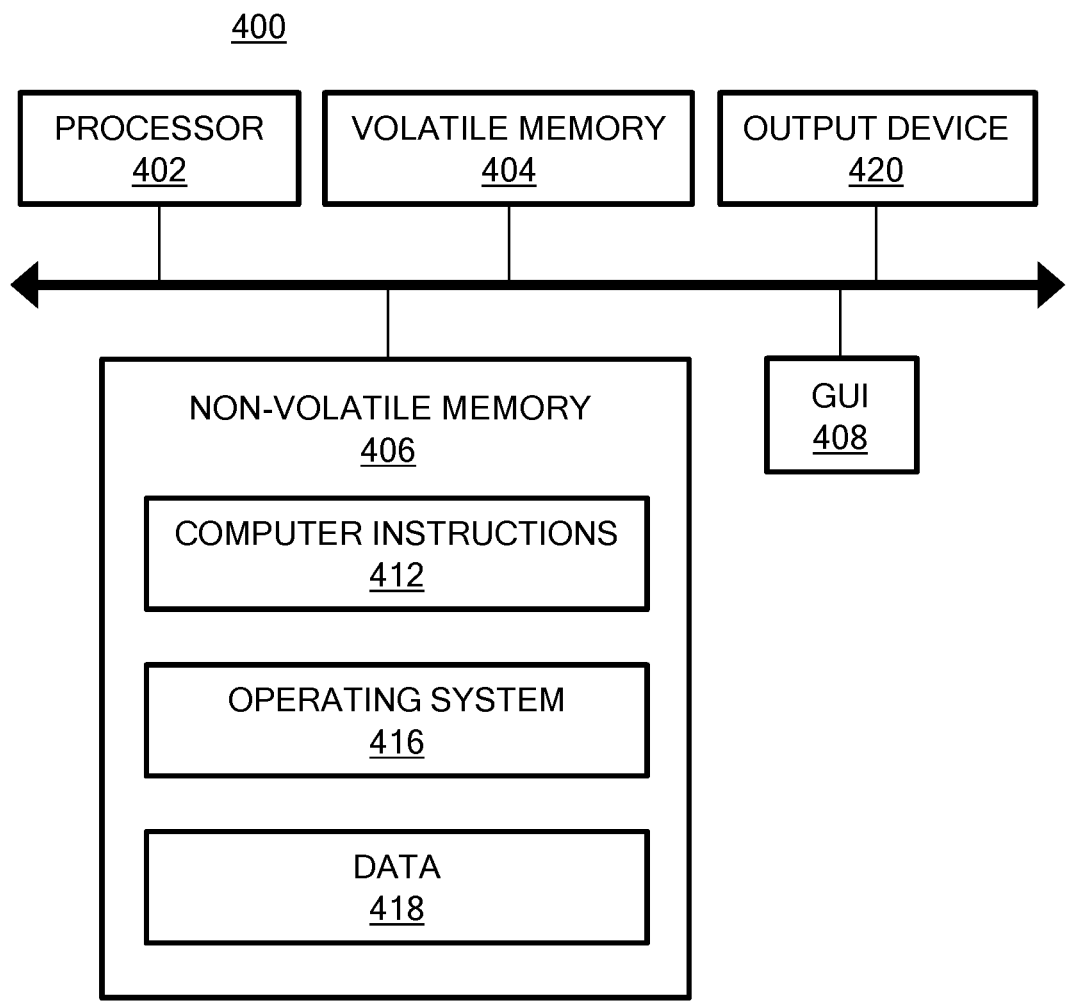
FIG. 4 is a block diagram of a hardware device that may perform at least a portion of the process shown in FIG. 3.

Referring to FIG. 4, in some embodiments, target site 112 may be implemented as one or more computers. Computer 400 may include processor 402, volatile memory 404 (e.g., RAM), non-volatile memory 406 (e.g., a hard disk drive, solid state drive such as a flash drive, a hybrid magnetic and solid state drive, etc.), graphical user interface (GUI) 408 (e.g., a mouse, a keyboard, a display, and so forth) and input/output (I/O) device 420. Non-volatile memory 406 stores computer instructions 412, an operating system 416 and data 418 such that, for example, the computer instructions 412 are executed by the processor 402 out of volatile memory 404 to perform at least a portion of the process 300 shown in FIG. 3. Program code may be applied to data entered using an input device of GUI 408 or received from I/O device 420.

Process 300 shown in FIG. 3 is not limited to use with the hardware and software of FIG. 4 and may find applicability in any computing or processing environment and with any type of machine or set of machines that is capable of running a computer program. Process 300 shown in FIG. 3 may be implemented in hardware, software, or a combination of the two.

The processes described herein are not limited to the specific embodiments described. For example, process 300 is not limited to the specific processing order shown in FIG. 3. Rather, one or more blocks of process 300 may be re-ordered, combined or removed, performed in parallel or in serial, as necessary, to achieve the results set forth herein.

Processor 402 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims In the above-described flow chart of FIG. 3, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 5:
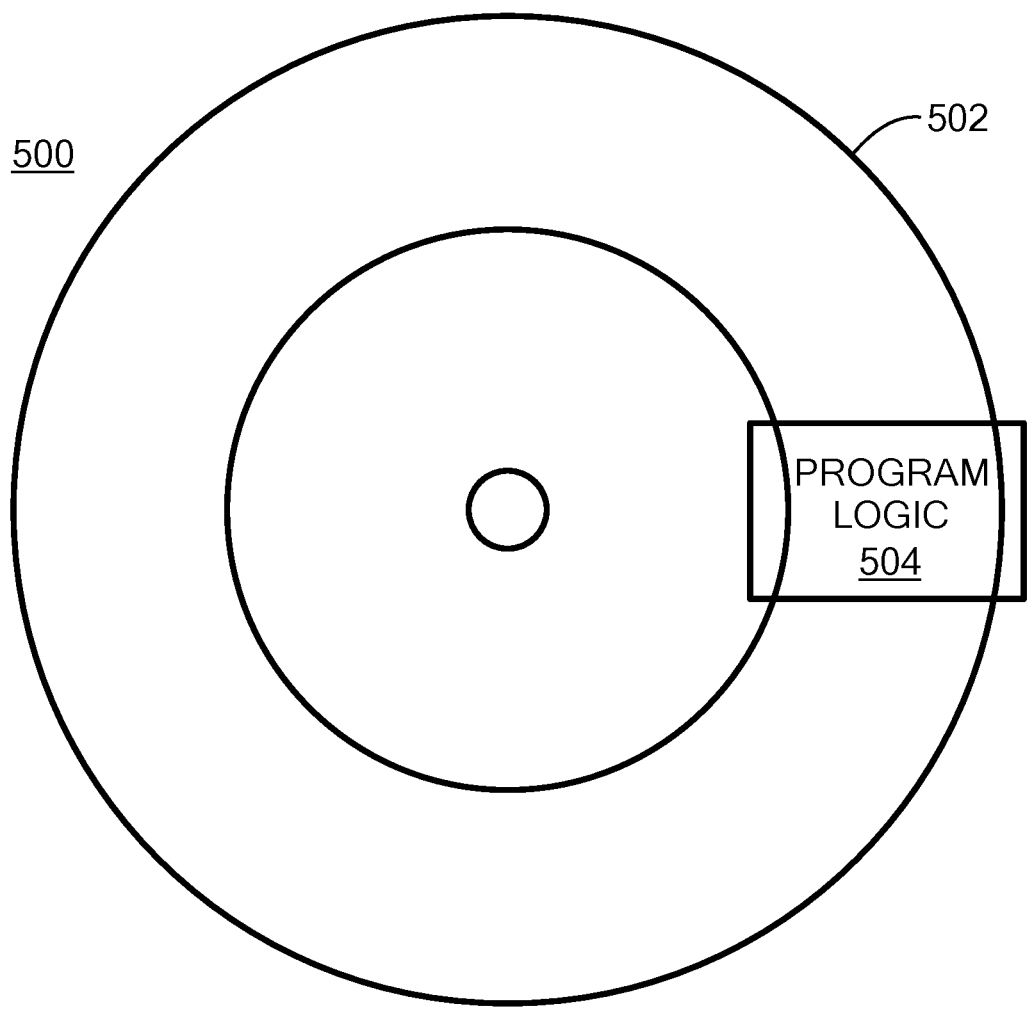
FIG. 5 a simplified block diagram of an apparatus that may be used to implement at least a portion of the systems of FIGS. 1-2 and 4 and at least a portion of the process of FIG. 3.

For example, when the program code is loaded into and executed by a machine, such as the computer of FIG. 4, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 5 shows Program Logic 504 embodied on a computer-readable medium 502 as shown, and wherein the Logic is encoded in computer-executable code configured for carrying out the reservation service process of this invention and thereby forming a Computer Program Product 500. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method, comprising:
    creating, at a first target site, an empty container in a storage system, the empty container matching a container at a source site in response to initiation of a cascading asynchronous data replication process;
    transmitting, by the first target site in response to creating the empty container, a command to a second target site to create a container at the second target site; and
    performing, by the first target site, the cascading asynchronous data replication process, comprising steps of:
    scanning the data upon receipt from the source site for a first target replication cycle;
    transmitting the scanned data to the container at the second target site for a second target replication cycle, the transmitting performed as the data is scanned at the first target site and before the first target replication cycle has completed;
    upon receipt of all the data from the source site, marking, by the first target site, the first target replication cycle as complete; and
    upon transmission of all the data to the second target site, marking, by the first target site, the second target replication cycle as complete;
    wherein the performing is implemented until all data for the first target replication cycle has been received at the first target site, and all data for the second target replication cycle has been transmitted to the second target site.

2. The method of claim 1, further comprising:
    upon marking the first target replication cycle as complete for the data received from the source site and marking the second target replication cycle as complete for the data transmitted to the second target site, transmitting an acknowledgement to the second target site.

3. The method of claim 2, wherein the second target site marks the container as a new consistent point in time for the cascading asynchronous data replication process.

4. The method of claim 1, further comprising:
    tracking operations of the cascading asynchronous data replication process, the tracking comprising:
        incrementing a cycle counter as the data is received at the first target site from the source site; and
        decrementing the cycle counter as the data is transmitted from the first target site to the second target site.

5. The method of claim 1, wherein the data is received by the first target site from the source site over a short-range communication network, and the data is transmitted by the first target site to the second target site over a long-range communication network.

6. The method of claim 1, wherein transmitting the scanned data to the container at the second target site for a second target replication cycle includes the first target site serving as a source for finding changes and transmitting the changes to the second target site.

7. The method of claim 1, wherein the data received at the first target site is a difference between a current set of snapshots subject to the cascading asynchronous data replication process and a previous set of snapshots.

8. A system, comprising:
    a memory comprising computer-executable instructions; and
    a processor operable by a first target site, the processor executing the computer-executable instructions, the computer-executable instructions when executed by the processor cause the processor to perform operations comprising:
    creating an empty container in a storage system, the empty container matching a container at a source site in response to initiation of a cascading asynchronous data replication process;
    transmitting a command to a second target site to create a container at the second target site; and performing the cascading asynchronous data replication process, comprising steps of:

scanning the data upon receipt from the source site for a first target replication cycle;

transmitting the scanned data to the container at the second target site for a second target replication cycle, the transmitting performed as the data is scanned at the first target site and before the first target replication cycle has completed:

upon receipt of all the data from the source site, marking, by the first target site, the first target replication cycle as complete; and upon transmission of all the data to the second target site, marking, by the first target site, the second target replication cycle as complete;

wherein the performing is implemented until all data for the first target replication cycle has been received at the first target site, and all data for the second target replication cycle has been transmitted to the second target site.

9. The system of claim 8, wherein the operations further include:

upon marking the first target replication cycle as complete for the data received from the source site and marking the second target replication cycle as complete for the data transmitted to the second target site, transmitting an acknowledgement to the second target site.

10. The system of claim 8, wherein the operations further include:

tracking operations of the cascading asynchronous data replication process, the tracking comprising:

incrementing a cycle counter as the data is received at the first target site from the source site; and decrementing the cycle counter as the data is transmitted from the first target site to the second target site.

11. The system of claim 8, wherein the data is received by the first target site from the source site over a short-range communication network, and the data is transmitted by the first target site to the second target site over a long-range communication network.

12. The system of claim 8, wherein the data received at the first target site is a difference between a current set of snapshots subject to the cascading asynchronous data replication process and a previous set of snapshots.

13. A computer program product embodied on a non-transitory computer readable medium, the computer program product including instructions that, when executed by a computer at a first target site, causes the computer to perform operations comprising:

creating an empty container in a storage system, the empty container matching a container at a source site in response to initiation of a cascading asynchronous data replication process;

transmitting a command to a second target site to create a container at the second target site; and performing the cascading asynchronous data replication process, comprising steps of:

scanning the data upon receipt from the source site for a first target replication cycle;

transmitting the scanned data to the container at the second target site for a second target replication cycle, the transmitting performed as the data is scanned at the first target site and before the first target replication cycle has completed;

upon receipt of all the data from the source site, marking, by the first target site, the first target replication cycle as complete; and upon transmission of all the data to the second target site, marking, by the first target site, the second target replication cycle as complete;

wherein the performing is implemented until all data for the first target replication cycle has been received at the first target site, and all data for the second target replication cycle has been transmitted to the second target site.

14. The computer program product of claim 13, wherein the operations further include:

upon marking the first target replication cycle as complete for the data received from the source site and marking the second target replication cycle as complete for the data transmitted to the second target site, transmitting an acknowledgement to the second target site.

15. The computer program product of claim 13, wherein the operations further include:

tracking operations of the asynchronous data replication process, the tracking comprising:

incrementing a cycle counter as the data is received at the first target site from the source site; and decrementing the cycle counter as the data is transmitted from the first target site to the second target site.

16. The computer program product of claim 13, wherein:

wherein further the data is received by the first target site from the source site over a short-range communication network, and the data is transmitted by the first target to the second target site over a long-range communication network.

17. The computer program product of claim 13, wherein the data received at the first target site is a difference between a current set of snapshots subject to the cascading asynchronous data replication process and a previous set of snapshots.

* * * * *